(12) United States Patent
Smith et al.

(10) Patent No.: US 11,293,295 B2
(45) Date of Patent: Apr. 5, 2022

(54) LABYRINTH SEAL WITH ANGLED FINS

(71) Applicant: PRATT & WHITNEY CANADA CORP., Longueuil (CA)

(72) Inventors: Alexander Smith, Montreal (CA); Pierre-Yves Legare, Chambly (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 147 days.

(21) Appl. No.: 16/570,066

(22) Filed: Sep. 13, 2019

(65) Prior Publication Data
US 2021/0079802 A1    Mar. 18, 2021

(51) Int. Cl.
| | | |
|---|---|---|
| F01D 11/02 | (2006.01) | |
| F01D 11/00 | (2006.01) | |
| F04D 29/10 | (2006.01) | |
| F16J 15/447 | (2006.01) | |

(52) U.S. Cl.
CPC ............ *F01D 11/02* (2013.01); *F01D 11/001* (2013.01); *F04D 29/102* (2013.01); *F05D 2220/32* (2013.01); *F05D 2240/55* (2013.01); *F16J 15/4472* (2013.01)

(58) Field of Classification Search
CPC ........ F16J 15/00; F16J 15/447; F16J 15/4472; F16J 15/4474; F01D 11/00; F01D 11/02; F01D 11/08; F01D 11/025; F01D 11/04; F01D 11/06; F01D 11/001; F04D 29/00; F04D 29/10; F04D 29/102; F04D 29/104; F05D 2220/00; F05D 2220/32; F05D 2220/321; F05D 2220/3213;
(Continued)

(56) References Cited

U.S. PATENT DOCUMENTS

| 3,989,410 A | 11/1976 | Ferrari |
| 4,320,903 A | 3/1982 | Ayache et al. |
| 4,351,532 A | 9/1982 | Laverty |

(Continued)

FOREIGN PATENT DOCUMENTS

| CN | 2913750 Y | 6/2007 |
| CN | 202371174 U | 8/2012 |

(Continued)

OTHER PUBLICATIONS

Guoqing Li, Qian Zhang, Zhijun Lei, Enliang Huang, Hongwei Wu, Gang Xu «Leakage performance of labyrinth seal broil sealing of aero-engine», Propulsion and Power Research, vol. 8, Issue 1, 2019, pp. 13-22, ISSN 2212-540X (https://www.sciencedirect.com/science/article/pii/S2212540X18300750).

*Primary Examiner* — Nathan Gumar
(74) *Attorney, Agent, or Firm* — Norton Rose Fulbright Canada LLP

(57) ABSTRACT

An aircraft engine having a shaft, an engine casing, at least one bearing located between the shaft and the engine casing, the engine casing defining a bearing cavity containing the at least one bearing, an air distribution system configured to inject compressed air to the bearing cavity to in use provide a sealing air flow entering the bearing cavity, and a labyrinth seal having a seal rotor and a seal stator, fins extending from one of the seal rotor and the seal stator toward the other of the seal rotor and the seal stator, at least one of the fins extending in an angled upstream direction relative to a direction of the sealing air flow.

20 Claims, 3 Drawing Sheets

(58) Field of Classification Search
CPC ...... F05D 2220/3215; F05D 2220/3216–3219;
F05D 2240/55
USPC .......................................................... 277/412
See application file for complete search history.

(56) References Cited

U.S. PATENT DOCUMENTS

| | | | |
|---|---|---|---|
| 4,397,471 A | 8/1983 | Feldman et al. | |
| 4,513,975 A | 4/1985 | Hauser et al. | |
| 4,976,444 A * | 12/1990 | Richards | F16J 15/443 |
| | | | 277/412 |
| 5,085,443 A | 2/1992 | Richards | |
| 5,161,943 A | 11/1992 | Maier et al. | |
| 5,218,816 A | 6/1993 | Plemmons et al. | |
| 5,297,928 A | 3/1994 | Imakiire et al. | |
| 5,890,873 A | 4/1999 | Willey | |
| 6,105,967 A | 8/2000 | Turnquist et al. | |
| 6,131,910 A | 10/2000 | Bagepalli et al. | |
| 6,131,911 A | 10/2000 | Cromer et al. | |
| 6,257,586 B1 | 7/2001 | Skinner et al. | |
| 6,302,645 B1 | 10/2001 | Kobayashi et al. | |
| 6,394,459 B1 | 5/2002 | Florin | |
| 6,435,513 B2 | 8/2002 | Skinner et al. | |
| 6,435,822 B1 | 8/2002 | Kobayashi et al. | |
| 6,517,314 B1 | 2/2003 | Burnett et al. | |
| 6,550,777 B2 | 4/2003 | Turnquist et al. | |
| 6,558,118 B1 | 5/2003 | Brisson et al. | |
| 6,589,012 B2 | 7/2003 | Burnett et al. | |
| 7,238,001 B2 | 7/2007 | Rushton | |
| 7,241,109 B2 | 7/2007 | Ferra | |
| 7,246,994 B2 | 7/2007 | Lewis | |
| 7,296,415 B2 | 11/2007 | Coulon et al. | |
| 8,066,475 B2 | 11/2011 | Bulgrin et al. | |
| 8,100,405 B2 | 1/2012 | Kneeland et al. | |
| 8,133,014 B1 * | 3/2012 | Ebert | F01D 11/025 |
| | | | 415/173.3 |
| 8,167,547 B2 | 5/2012 | Wu et al. | |
| 8,360,712 B2 | 1/2013 | Deo et al. | |
| 8,721,264 B2 | 5/2014 | Behaghel et al. | |
| 8,784,045 B2 | 7/2014 | Zoric et al. | |
| 8,840,114 B2 | 9/2014 | Dixon et al. | |
| 8,858,162 B2 | 10/2014 | Manzoori | |
| 8,894,360 B2 | 11/2014 | Pegouet | |
| 8,926,269 B2 | 1/2015 | Dillard et al. | |
| 9,022,390 B2 * | 5/2015 | Amador | F01D 11/02 |
| | | | 277/418 |
| 9,057,279 B2 * | 6/2015 | Lotfi | F16J 15/4472 |
| 9,151,174 B2 | 10/2015 | Chouhan | |
| 9,234,434 B2 * | 1/2016 | Stefanis | F01D 11/02 |
| 9,546,561 B2 | 1/2017 | Pouzet et al. | |
| 9,567,908 B2 * | 2/2017 | Bordne | F01D 25/125 |
| 9,638,052 B2 * | 5/2017 | Shorney | F04D 29/102 |
| 9,841,104 B2 | 12/2017 | Uehara et al. | |
| 9,879,607 B2 | 1/2018 | Brunet et al. | |
| 10,161,259 B2 | 12/2018 | Gibson et al. | |
| 2011/0070074 A1 | 3/2011 | Schabowski et al. | |
| 2013/0241153 A1 * | 9/2013 | Garrison | F16J 15/40 |
| | | | 277/350 |
| 2014/0064909 A1 | 3/2014 | Trivedi et al. | |
| 2016/0258310 A1 * | 9/2016 | Turner | F01D 11/02 |
| 2018/0320540 A1 | 11/2018 | Raper | |
| 2018/0340439 A1 | 11/2018 | Vinski | |
| 2018/0347386 A1 | 12/2018 | Sellhorn et al. | |
| 2019/0003326 A1 | 1/2019 | Simeone et al. | |
| 2019/0072186 A1 | 3/2019 | Bidkar et al. | |
| 2019/0093496 A1 | 3/2019 | Hardikar et al. | |
| 2019/0153884 A1 | 5/2019 | MirzaMoghadam et al. | |
| 2019/0162069 A1 | 5/2019 | Trohel et al. | |
| 2019/0186282 A1 | 6/2019 | Scholtes et al. | |

FOREIGN PATENT DOCUMENTS

| | | |
|---|---|---|
| CN | 202500616 U | 10/2012 |
| CN | 102953771 A | 3/2013 |
| CN | 102016233 B | 9/2014 |
| CN | 203835783 U | 9/2014 |
| CN | 104074558 A | 10/2014 |
| CN | 104315151 A | 1/2015 |
| CN | 104373601 A | 2/2015 |
| CN | 104455462 A | 3/2015 |
| CN | 102135019 B | 6/2015 |
| CN | 105041479 A | 11/2015 |
| CN | 105065680 A | 11/2015 |
| CN | 105134953 A | 12/2015 |
| CN | 104204418 B | 3/2016 |
| CN | 104454031 B | 4/2016 |
| CN | 104454032 B | 4/2016 |
| CN | 102865108 B | 5/2016 |
| CN | 103306749 B | 5/2016 |
| CN | 103696980 B | 6/2016 |
| CN | 104126088 B | 6/2016 |
| CN | 103322203 B | 9/2016 |
| CN | 205744002 U | 11/2016 |
| CN | 102979627 B | 4/2017 |
| CN | 105318011 B | 4/2017 |
| CN | 108180160 A | 6/2018 |
| CN | 109026819 A | 12/2018 |
| CN | 109505665 A | 3/2019 |
| CN | 107654354 A | 4/2019 |
| CN | 105465188 B | 5/2019 |
| EP | 947667 B1 | 12/2004 |
| EP | 816726 B1 | 9/2006 |
| EP | 1526253 B1 | 5/2007 |
| EP | 2453111 A2 | 5/2012 |
| EP | 2286065 B1 | 7/2013 |
| EP | 2636853 B1 | 3/2015 |
| EP | 2281108 B1 | 7/2015 |
| EP | 2412933 B1 | 9/2016 |
| EP | 2568121 B1 | 11/2016 |
| EP | 1600607 B1 | 3/2017 |
| EP | 2828489 B1 | 3/2018 |
| EP | 3333372 A1 | 6/2018 |
| EP | 3018299 B1 | 6/2019 |
| EP | 3159488 B1 | 6/2019 |
| GB | 2042086 A | 9/1980 |
| GB | 2158495 A | 11/1985 |
| GB | 2272946 A | 6/1994 |
| GB | 2443117 B | 8/2008 |
| GB | 2506478 B | 3/2018 |
| JP | 11051200 A | 2/1999 |
| JP | 03567064 B2 | 9/2004 |
| JP | 03820186 B2 | 9/2006 |
| JP | 04143060 B2 | 9/2008 |
| JP | 04296465 B2 | 7/2009 |
| JP | 04722553 B2 | 7/2011 |
| JP | 05227114 B2 | 7/2013 |
| JP | 05484443 B2 | 5/2014 |
| JP | 05548186 B2 | 7/2014 |
| JP | 05643245 B2 | 12/2014 |
| JP | 05693529 B2 | 4/2015 |
| JP | 05851890 B2 | 2/2016 |
| JP | 06088634 B2 | 3/2017 |
| JP | 06220191 B2 | 10/2017 |
| JP | 2019002361 A | 1/2019 |
| KR | 1741332 B1 | 5/2017 |

* cited by examiner

LABYRINTH SEAL WITH ANGLED FINS

TECHNICAL FIELD

The application relates generally to gas turbine engines and, more particularly, to seals used in such engines.

BACKGROUND OF THE ART

It is often desirable to use seal assemblies for isolating various parts or spaces from one another. As one example, in a gas turbine engine having a rotatable shaft supported by a shaft bearing, it is desirable to provide lubricant to the shaft bearing while limiting lubricant leakage to surrounding components. An isolated chamber is formed around the shaft bearing by casing members for the purpose of retaining lubricant, and a seal assembly is used to seal between the static casing members and the rotatable shaft.

SUMMARY

In one aspect, there is provided an aircraft engine comprising a shaft, an engine casing, at least one bearing located between the shaft and the engine casing, the engine casing defining a bearing cavity containing the at least one bearing, an air distribution system configured to inject compressed air to the bearing cavity to in use provide a sealing air flow entering the bearing cavity, and a labyrinth seal having a seal rotor and a seal stator, fins extending from one of the seal rotor and the seal stator toward the other of the seal rotor and the seal stator, at least one of the fins extending in an angled upstream direction relative to a direction of the sealing air flow.

In another aspect, there is provided a labyrinth seal assembly for sealing a bearing cavity, comprising: a seal rotor securable to a rotatable shaft; and a seal stator securable to a housing, one of the seal rotor and the seal stator defining fins extending therefrom toward the other of the seal rotor and the seal stator, at least one of the fins extending in an angled upstream direction relative to a sealing air flow injected in the bearing cavity, at least another one of the fins extending from the one of the seal rotor and the seal stator at an angle different than that of the at least one of the fins.

In yet another aspect, there is provided a labyrinth seal assembly for sealing a bearing cavity, comprising: a seal rotor securable to a rotatable shaft; and a seal stator securable to a housing, one of the seal rotor and the seal stator defining fins extending therefrom toward the other of the seal rotor and the seal stator, at least one of the fins extending from the one of the seal rotor and the seal stator and away from the bearing cavity.

DESCRIPTION OF THE DRAWINGS

Reference is now made to the accompanying figures in which.

DETAILED DESCRIPTION

Figure 1:
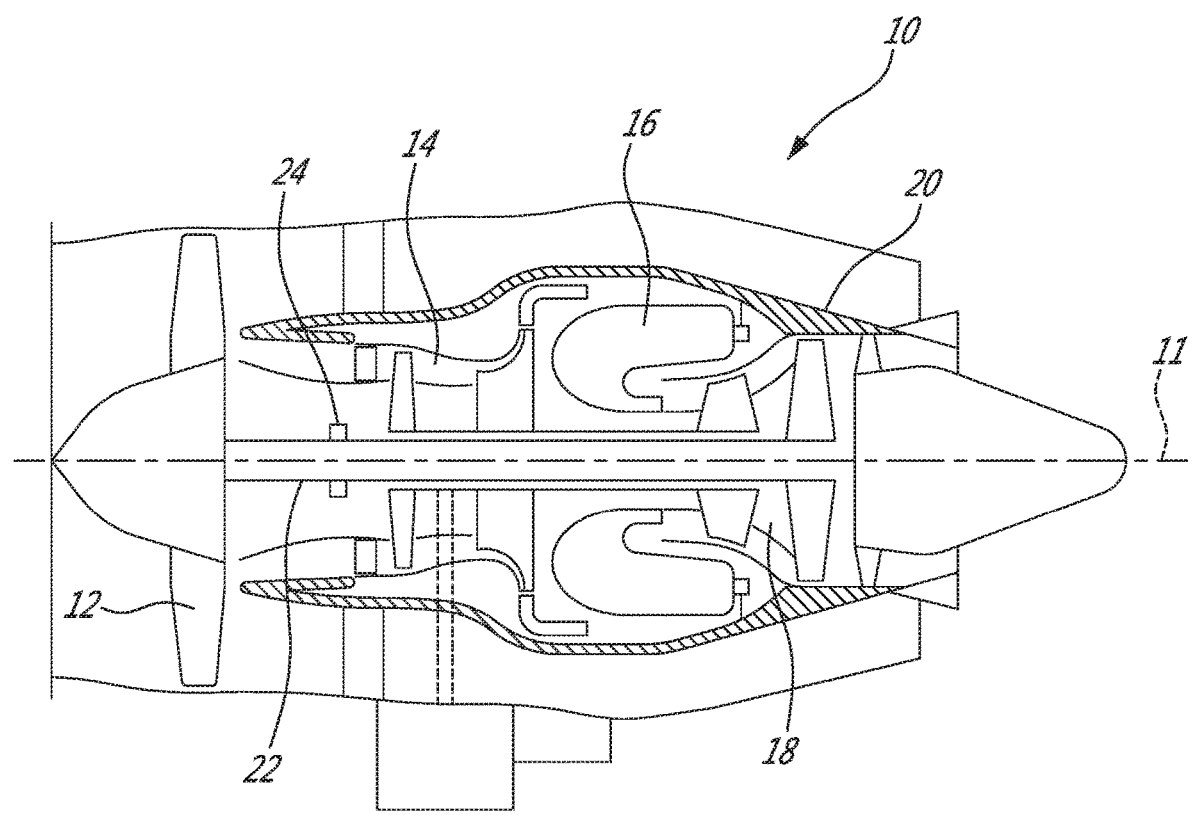
FIG. 1 is a schematic cross-sectional view of a gas turbine engine.

FIG. 1 illustrates an aircraft engine, in this example a gas turbine engine 10, of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10.

The gas turbine engine 10 has an engine casing 20 that circumferentially extends around the central axis 11 and surrounds the compressor section 14, the combustor 16, and the turbine section 18. The gas turbine engine 10 includes a shaft 22 that is coaxial with the central axis 11. For rotatably supporting the shaft, bearings 24 (only one illustrated in FIG. 1) may be located along the shaft 22 and may be disposed radially between the engine casing 20 and the shaft 22. A lubricant distribution system (not shown) is provided to supply lubricant to the bearing 24.

Figure 2:
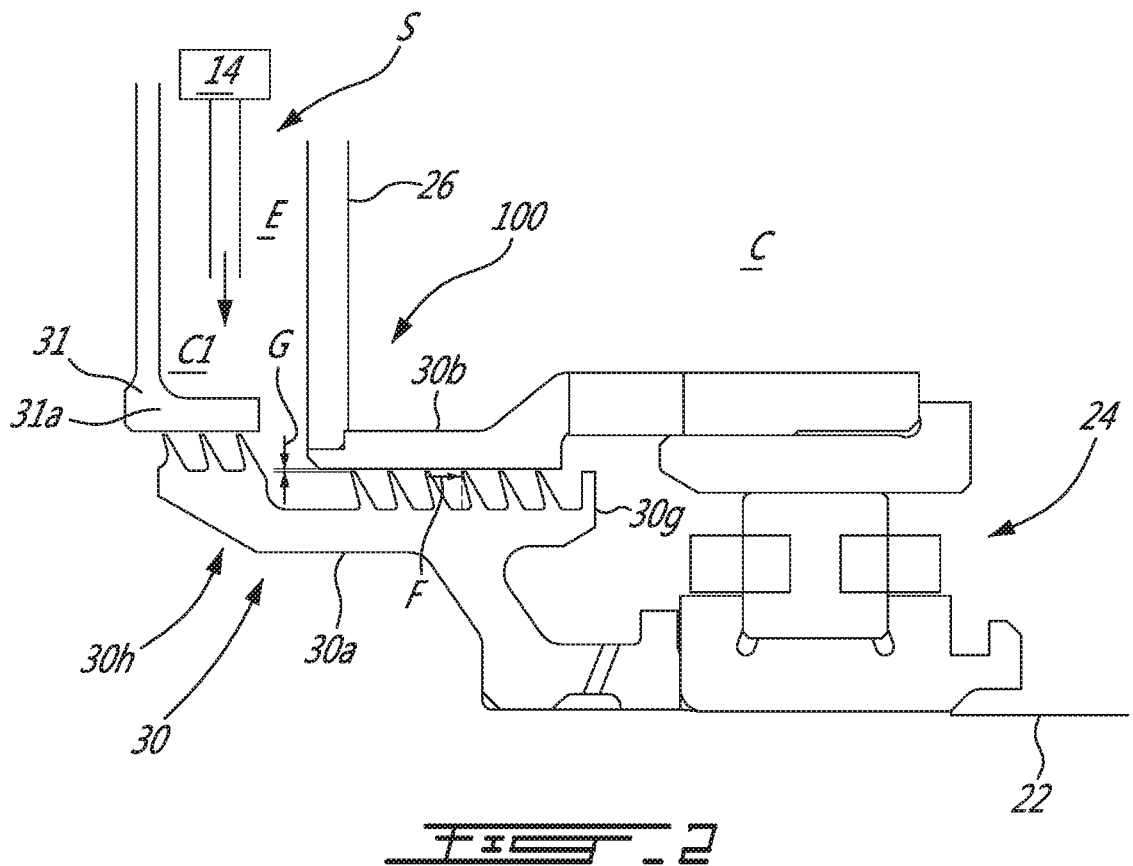
FIG. 2 is a schematic cross-sectional view of a labyrinth seal assembly in accordance with one embodiment.

Referring now to FIGS. 1-2, in order to limit lubricant from leaking outside the bearing cavity C, a labyrinth seal assembly 100 is provided. The assembly 100 may include a housing 26. The housing 26 may circumferentially extend all around the central axis 11 of the gas turbine engine 10. The housing 26 may be a separate component that is secured to the engine casing 20 (FIG. 1) at its radially-outer end and may extend radially between the shaft 22 (FIG. 1) and the engine casing 20 relative to the central axis 11. Alternatively, the housing 26 may be defined by the engine casing 20.

The housing 26 defines a chamber or cavity C therein. The cavity C is fluidly connected to a source of lubricant for receiving lubricant therein. As shown in FIG. 2, the bearing 24 is located inside the cavity C defined by the housing 26. Therefore, the bearing 24 may be continually fed with lubricant from the source of lubricant. The housing 26 is used for containing the lubricant therein. However, a leakage path is present at an interface between the housing 26 and the shaft 22. To limit lubricant leakages through the leakage path, one or more seals are provided as part of the labyrinth seal assembly 100 and are disposed radially between the housing 26, and the shaft 22 relative to the central axis 11.

Figure 3:
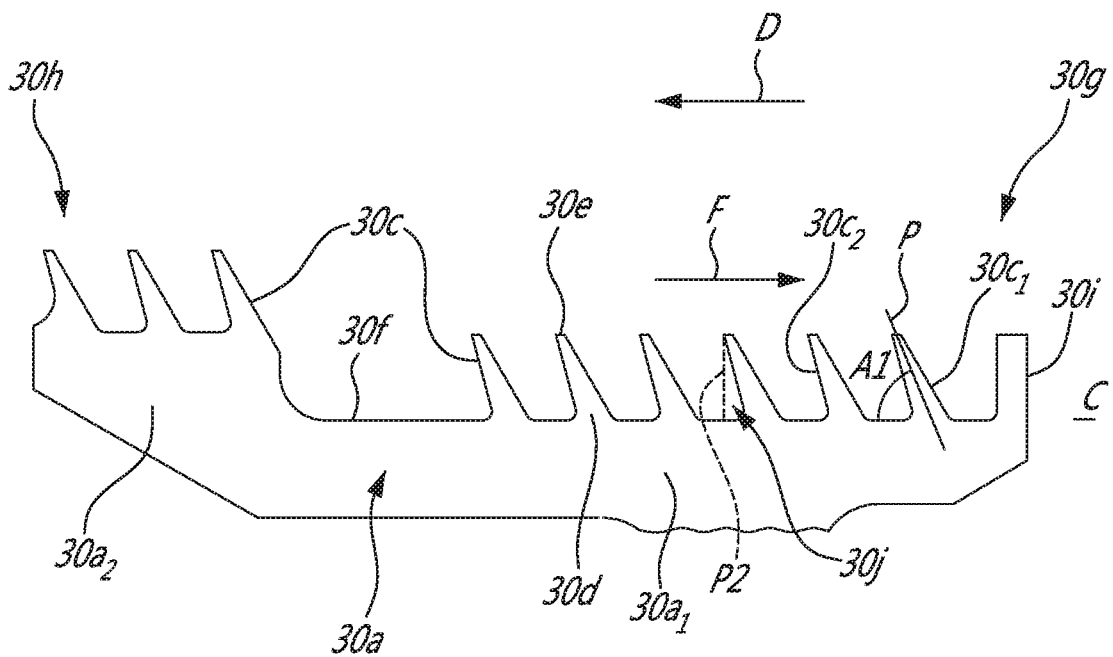
FIG. 3 is an enlarged view of a portion of FIG. 2.

Referring to FIG. 3 with continued reference to FIGS. 1-2, a labyrinth seal 30 may be used to prevent or limit lubricant leakage out of the cavity C. The seal 30 includes a seal rotor, also referred to as a seal runner, 30a and a seal stator, also referred to as a static seal portion, 30b. The seal rotor 30a is secured to the shaft 22 for joint rotation therewith relative to the central axis 11. The seal stator 30b is secured to the housing 26, which is, in turn, secured to the engine casing 20. The seal stator 30b defines a sealing engagement with the seal rotor 30a. It is understood that, although not shown herein, a similar labyrinth seal assembly 100 may be located on a right-hand side of the bearing 24.

In the embodiment shown, the seal rotor 30a is stepped as it includes two portions $30a_1$ and $30a_2$ that may be axially offset from one another and radially offset from one another relative to the rotation axis 11. In the embodiment shown, the first seal rotor portion $30a_1$ is located on an inboard side, that is on a cavity side, of the labyrinth seal 30 and the second seal rotor portion $30a_2$ is located on an outboard side, that is on an environment side, of the seal 30. In the embodiment shown, the second seal rotor portion $30a_2$ is located radially outwardly of the first seal rotor portion $30a_1$ relative to the axis 11. In other words, the first portion $30a_1$ is closer to the shaft 22 than the second portion $30a_2$. Other configurations are contemplated, notably without a stepped configuration.

A member 31, which may be secured to the engine casing 20, may extend radially inwardly therefrom relative to the central axis 11 and may be axially offset of the housing 26 to create a space C1 between the housing 26 and the environment E. The member 31 may define a seal stator portion 31a at a radially-inner extremity. The seal stator portion 31a of the member 31 may be in a sealing engagement with the second seal rotor portion $30a_2$ of the seal rotor 30a.

In the embodiment shown, the gas turbine engine 10 includes an air distribution system S that is used to supply compressed air from the compressor section 14 to different components of the engine 10 in need of compressed air. Alternatively, the compressed air may be supplied from an environment outside the gas turbine engine. In the embodiment shown, the air distribution system S supplies compressed air proximate the housing 26 and outside of the cavity C, but inside the space C1 to maintain an air pressure within the space C1 greater than that inside the bearing cavity C. The space C1 is located between the cavity C and the environment E outside both of the cavity C and the space C1. The sealing engagement between the seal stator portion 31a of the member 31 and the second seal rotor portion $30a_2$ may prevent the compressed air from escaping the space C1 and from being diffused in the environment E. In other words, the sealing engagement between the seal stator portion 31a of the member 31 and the second seal rotor portion $30a_2$ may force the compressed to flow inside the bearing cavity via the gap G between the seal rotor 30a and the seal stator 30b. In a particular embodiment, the member 31 and the space C1 are omitted.

In such a case, a sealing air flow F including compressed air may circulate from the space C1 to the cavity C and may help in containing the lubricant within the bearing cavity C. The sealing air flow F may enter the bearing cavity C via the gap G between the seal rotor 30a and the seal stator 30b.

Referring to FIGS. 2 and 3, the seal 30 includes a plurality of axially distributed fins 30c, i.e., fins having different axial positions along axis 11 or, stated differently, fins spaced apart along axis 11. In the depicted embodiment, the fins 30c are part of the seal rotor 30a, but might alternatively be part of the seal stator 30b. Each of the fins 30c has a root 30d and a distal tip 30e that is radially spaced apart from the root 30d. The fins 30c may taper from their roots 30d to their tips 30e, though they may have a straight body as well. The fins 30c extend from an outer circumferential surface 30f of the seal rotor 30a that is oriented toward the seal stator 30b. The roots 30d of the fins 30c are located at the surface 30f of the seal rotor 30a. In the embodiment shown, the surface 30f is optionally cylindrical and extends all around the axis 11. Other configurations are contemplated without departing from the scope of the present disclosure.

The tips 30e of the fins 30c are radially spaced apart from the seal stator 30b to define the gap G therebetween. A cooperation of the fins 30c with the seal stator 30b is intended to limit lubricant contained within the cavity C from leaking outside of the cavity C.

Referring more particularly to FIG. 3, the fins 30c are angled in an upstream direction D relative to the sealing flow F. Stated differently, the fins 30c extend from the face 30f of the seal rotor 30a and away from the bearing cavity C. In other words, the fins 30c extend radially away from the seal rotor surface 30f and axially away from the bearing cavity C relative to the axis 11. One, more than one, or all of the fins 30c may be angled in the upstream direction D. Another way to define the angle is that the fins 30c are frusto-conical, flaring away from the bearing cavity C. In the embodiment shown, the fins 30c of both of the first and second portions $30a_1$, $30a_2$ of the seal rotor 30a are angled in the upstream direction D. In the embodiment shown, all of the fins 30c are angled at the same angle A1. The angle A1 may range between 0 and 90 degrees, preferably from about 30 to about 45 degrees, preferably about 30 degrees. Herein, the expression "about" means that a value may vary by plus or minus 10% of the value. The angle A1 is taken from the seal rotor surface 30f to mid-planes P of the fins 30c; the mid-planes P of the fins 30c may be located at equal distance between inboard and outboard faces $30c_1$, $30c_2$ of the fins 30c.

Still referring to FIG. 3, concavities 30j are defined between the fins outboard faces $30c_2$ and the rotor surface 30f. The outboard faces $30c_2$ of the fins 30c extend axially toward the bearing cavity C from their tips 30e to their root 30d. In other words, the outboard faces $30c_2$ of the fins 30c are axially offset relative to the axis 11 from a radial projection P2 relative to the axis 11 of the tips 30e of the fins 30c on the surface 30f of the seal rotor 30a.

As aforementioned, a positive pressure differential is created with the air distribution system S and might be used during all operating conditions to limit lubricant leakage from the bearing cavity C. To limit an amount of compressed air injected in the cavity C, a small clearance, or a small gap G, is required. In a particular embodiment, using angled labyrinth fins as described above allows an improvement of sealing of ~10% compared to a configuration using straight fins. However, during shutdown of the gas turbine engine 10, the air distribution system S might not be able to supply the required amount of compressed air to create the sealing flow F, and in some cases, the angled fins 30c might direct the lubricant outside the cavity C.

In the embodiment shown, a rotor radial protrusion 30i is provided and located on an inboard side 30g, opposed to an outboard side 30h, of the seal rotor 30a. As illustrated more clearly in FIG. 2, the rotor radial protrusion 30i is axially offset from the seal stator 30b. That is, the seal stator 30b does not overlap the rotor radial protrusion 30i. The rotor radial protrusion 30i may be considered to be inside the cavity C. In the depicted embodiment, the rotor radial protrusion 30i extends perpendicularly from the seal rotor face 30f. In the embodiment shown, the rotor radial protrusion 30i has a constant width from its root to its tip. In some cases, the rotor radial protrusion 30i is omitted. The rotor radial protrusion 30i may contribute in limiting lubricant leakage from the bearing cavity C during shutdown of the engine 10. The rotor radial protrusion may be used to push the lubricant back to the cavity C. In other words, the rotor radial protrusion may catch the lubricant and sling it back to the cavity C.

Figure 4:
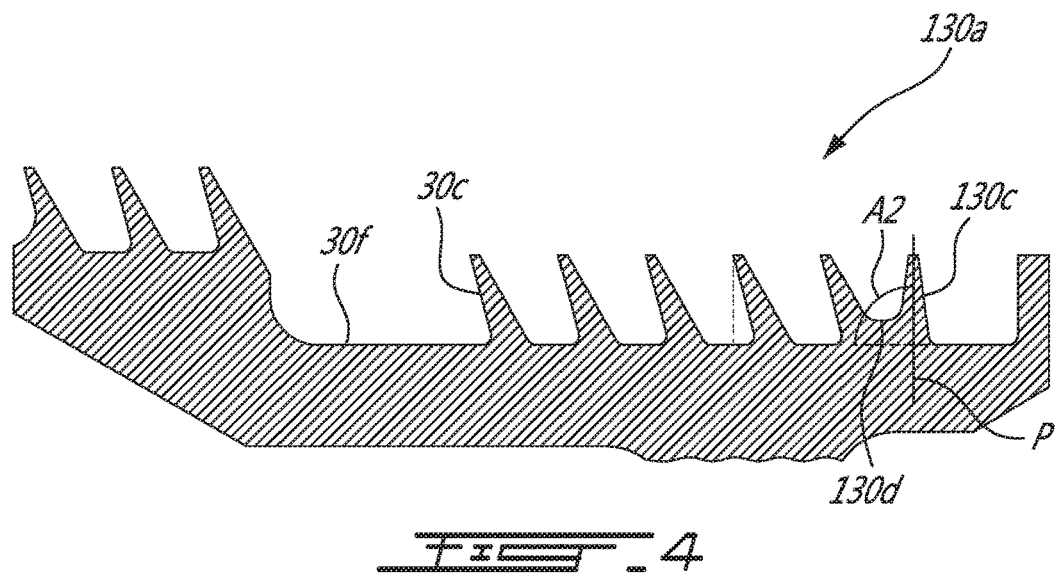
FIG. 4 is a schematic cross-sectional view of a portion of a seal rotor in accordance with another embodiment.

Referring now to FIG. 4, a seal rotor 130a of a labyrinth seal in accordance with another embodiment is shown. For the sake of conciseness, only elements that differ from the seal rotor 30a described herein above with reference to FIGS. 2-3 are described.

In the embodiment shown, at least one of the fins 30c, referred to herein below as the inboard-most fin 130c, is angled relative to the seal rotor face 30f at an angle A2 which is different than the angle A1 of a remainder of the fins 30c.

The inboard-most fin 130c is located at an interface with the bearing cavity C. Stated differently, the inboard-most fin 130c is a downstream-most one of the fins relative to the sealing air flow F (FIG. 3). The angle A2 of the inboard-most fin 130c may range from the angle A1 to at most 90 degrees. In a particular embodiment, a plurality of the fins located on an inboard side of the seal rotor 30a may be slanted at the angle A2.

In the embodiment shown, a web 130d connects the inboard-most fin 130c with an adjacent one of the fins 30c. A radial thickness of the seal rotor 30a relative to the axis 11 may be greater at the web 130d than that between two others of the fins 30c. The web 130d may increase stiffness of the fins 130c, 30c connected by the web 130d.

Figure 5:
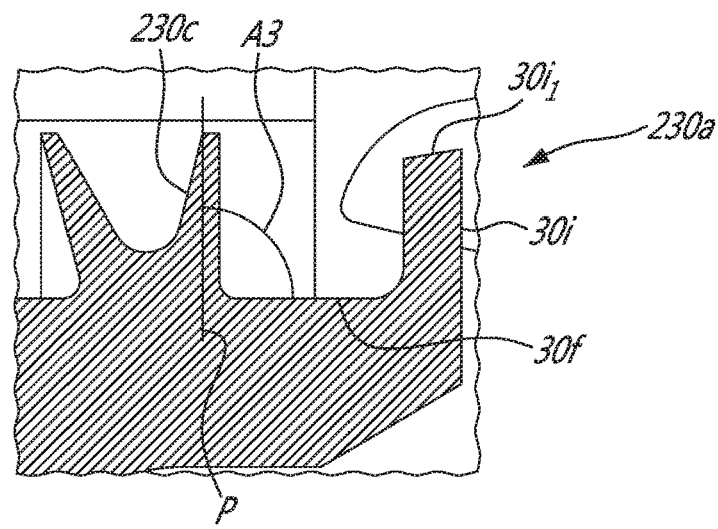
FIG. 5 is a schematic cross-sectional view of a portion of a seal rotor in accordance with another embodiment.

Referring now to FIG. 5, a seal rotor 230a of a labyrinth seal in accordance with another embodiment is shown. For the sake of conciseness, only elements that differ from the seal rotor 130a described herein above with reference to FIG. 4 are described.

In the embodiment shown, the inboard-most fin 230c defines an angle A3 of 90 degrees relative to the seal rotor face 30f. In a particular embodiment, a plurality of the fins located on an inboard side of the seal rotor 230a may be slanted at the angle A3.

In the embodiment shown, a tip of the rotor radial protrusion 30i defines a surface $30i_1$ that slopes toward the inboard-most fin 230c. In other words, a radial distance from the axis 11 to the surface $30i_1$ increases toward the bearing cavity C. In a particular embodiment, the surface that slopes toward the inboard-most fin 230c may direct lubricant toward the inboard-most fin, which will in turn push the lubricant toward the cavity C. Such a configuration may facilitate pushing back of the lubricant.

Figure 6:
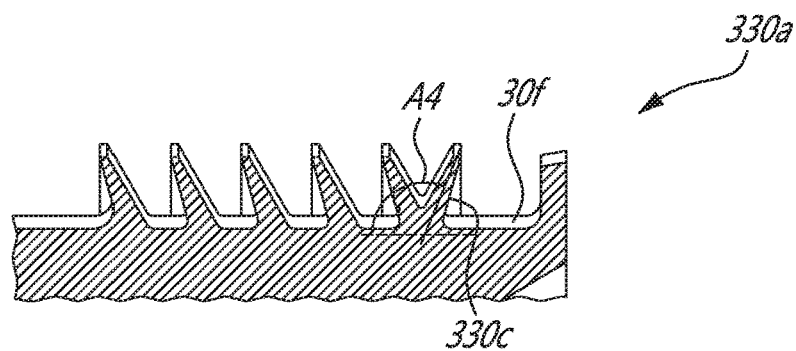
FIG. 6 is a schematic cross-sectional three dimensional view of a portion of a seal rotor in accordance with yet another embodiment.

Referring now to FIG. 6, a seal rotor 330a of a labyrinth seal in accordance with another embodiment is shown. For the sake of conciseness, only elements that differ from the seal rotor 130a described herein above with reference to FIG. 3 are described.

In the embodiment shown, the inboard-most fin 330c defines an angle A4 relative to the seal rotor face 30f ranging to more than 90 degrees to 135 degrees. In the embodiment shown, the inboard-most fin 330c is slanted toward the bearing cavity C. In a particular embodiment, a plurality of the fins located on an inboard side of the seal rotor 330a may be slanted at the angle A4.

In a particular embodiment, a combination of angled fins and of the inboard-most fin at the interface with the bearing cavity C allows for better sealing at running conditions and reduced lubricant leakage when the air pressure difference between the bearing cavity C and the environment E decreases following engine shutdown. In a particular embodiment, the disclosed seal rotors allow to improve sealing of the bearing cavity compared to a configuration having straight fins. The disclosed seal rotors might allow for a greater tip clearance for the same sealing efficiency of a configuration having straight fins.

Embodiments disclosed herein include:

A. An aircraft engine comprising a shaft, an engine casing, at least one bearing located between the shaft and the engine casing, the engine casing defining a bearing cavity containing the at least one bearing, an air distribution system configured to inject compressed air to the bearing cavity to in use provide a sealing air flow entering the bearing cavity, and a labyrinth seal having a seal rotor and a seal stator, fins extending from one of the seal rotor and the seal stator toward the other of the seal rotor and the seal stator, at least one of the fins extending in an angled upstream direction relative to a direction of the sealing air flow.

B. A labyrinth seal assembly for sealing a bearing cavity, comprising: a seal rotor securable to a rotatable shaft; and a seal stator securable to a housing, one of the seal rotor and the seal stator defining fins extending therefrom toward the other of the seal rotor and the seal stator, at least one of the fins extending in an angled upstream direction relative to a sealing air flow injected in the bearing cavity, at least another one of the fins extending from the one of the seal rotor and the seal stator at an angle different than that of the at least one of the fins.

C. A labyrinth seal assembly for sealing a bearing cavity, comprising: a seal rotor securable to a rotatable shaft; and a seal stator securable to a housing, one of the seal rotor and the seal stator defining fins extending therefrom toward the other of the seal rotor and the seal stator, at least one of the fins extending from the one of the seal rotor and the seal stator and away from the bearing cavity.

Embodiments A, B, and C may include any of the following elements in any combinations:

Element 1: at least another one of the fins extends from the one of the seal stator and the seal rotor at an angle being different than that of the at least one of the fins. Element 2: all of the fins extend in the angled upstream direction. Element 3: at least another one of the fins extends in an angled downstream direction relative to the sealing air flow. Element 4: the at least other one of the fins is an inboard-most one of the fins. Element 5: at least another one of the fins extends perpendicularly from the one of the seal rotor and the seal stator. Element 6: the at least other one of the fins is an inboard-most one of the fins. Element 7: the at least one of the fins defines an angle ranging from 30 to 45 degrees with a face of the one of the seal rotor and the seal stator from which the at least one of the fins protrudes. Element 8: a radial protrusion on an inboard side of the labyrinth seal and secured to the one of the seal rotor and the seal stator, the radial protrusion being axially offset from the other of the seal rotor and the seal stator. Element 9: at least another one of the fins extends from the one of the seal rotor and the seal stator and toward the bearing cavity at an angle different than that of the at least one of the fins.

The above description is meant to be exemplary only, and one skilled in the art will recognize that changes may be made to the embodiments described without departing from the scope of the invention disclosed. For example, the fins and the radial protrusion may be defined by the seal stator instead of by the seal rotor. The labyrinth seal may be used for any other applications different than bearing cavities. Still other modifications which fall within the scope of the present invention will be apparent to those skilled in the art, in light of a review of this disclosure, and such modifications are intended to fall within the appended claims.

The invention claimed is:

1. An aircraft engine comprising: a shaft, an engine casing, at least one bearing located between the shaft and the engine casing, the engine casing defining a bearing cavity containing the at least one bearing, an air distribution system configured to inject compressed air to the bearing cavity to in use provide a sealing air flow entering the bearing cavity, and a labyrinth seal having a seal rotor and a seal stator, fins extending from one of the seal rotor and the seal stator toward the other of the seal rotor and the seal stator, at least one of the fins extending away form the bearing cavity in an angled upstream direction relative to a direction of the sealing air flow entering the bearing cavity through the labyrinth seal.

2. The aircraft engine of claim 1, wherein at least another one of the fins extends from the one of the seal stator and the seal rotor at an angle being different than that of the at least one of the fins.

3. The aircraft engine of claim 1, wherein all of the fins extend in the angled upstream direction.

4. The aircraft engine of claim 1, wherein at least another one of the fins extends in an angled downstream direction relative to the sealing air flow.

5. The aircraft engine of claim 4, wherein the at least other one of the fins is located closer to the bearing cavity than a remainder of the fins.

6. The aircraft engine of claim 1, wherein at least another one of the fins extends perpendicularly from the one of the seal rotor and the seal stator.

7. The aircraft engine of claim 6, wherein the at least other one of the fins is located closer to the bearing cavity than a remainder of the fins.

8. The aircraft engine of claim 1, wherein the at least one of the fins defines an angle ranging from 30 to 45 degrees with a face of the one of the seal rotor and the seal stator from which the at least one of the fins protrudes.

9. The aircraft engine of claim 1, further comprising a radial protrusion on an inboard side of the labyrinth seal and secured to the one of the seal rotor and the seal stator, the radial protrusion being axially offset from the other of the seal rotor and the seal stator.

10. A labyrinth seal assembly for sealing a bearing cavity, comprising: a seal rotor securable to a rotatable shaft; and a seal stator securable to a housing, one of the seal rotor and the seal stator defining fins extending therefrom toward the other of the seal rotor and the seal stator, at least one of the fins extending away from the bearing cavity in an angled upstream direction relative to a sealing air flow injected in the bearing cavity by flowing between the seal rotor and the seal stator, at least another one of the fins extending from the one of the seal rotor and the seal stator at an angle different than that of the at least one of the fins.

11. The labyrinth seal assembly of claim 10, wherein the fins extend from the seal rotor.

12. The labyrinth seal assembly of claim 10, wherein all of the fins extend in the angled upstream direction.

13. The labyrinth seal assembly of claim 10, wherein the at least other one of the fins extends in an angled downstream direction relative to the sealing air flow.

14. The labyrinth seal of claim 13, wherein the at least other one of the fins is located closer to the bearing cavity than a remainder of the fins.

15. The labyrinth seal assembly of claim 10, wherein the at least other one of the fins extends perpendicularly from the one of the seal rotor and the seal stator.

16. The labyrinth seal of claim 15, wherein the at least other one of the fins is located closer to the bearing cavity than a remainder of the fins.

17. The labyrinth seal assembly of claim 10, wherein the at least one of the fins defines an angle ranging from 30 to 45 degrees with a face of the one of the seal rotor and the seal stator from which the at least one of the fins protrudes.

18. The labyrinth seal assembly of claim 10, further comprising a radial protrusion on an inboard side of the labyrinth seal and secured to the one of the seal rotor and the seal stator, the radial protrusion being axially offset from the other of the seal rotor and the seal stator.

19. A labyrinth seal assembly for sealing a bearing cavity, comprising: a seal rotor securable to a rotatable shaft; and a seal stator securable to a housing, one of the seal rotor and the seal stator defining fins extending therefrom toward the other of the seal rotor and the seal stator, at least one of the fins extending from the one of the seal rotor and the seal stator and angled away from the bearing cavity.

20. The labyrinth seal assembly of claim 19, wherein at least another one of the fins extends from the one of the seal rotor and the seal stator and toward the bearing cavity at an angle different than that of the at least one of the fins.

* * * * *